United States Patent
Iino

(10) Patent No.: US 6,733,055 B2
(45) Date of Patent: May 11, 2004

(54) AUTOMOTIVE BUMPER STRUCTURE

(75) Inventor: Atsushi Iino, Tokyo-To (JP)

(73) Assignee: Fuji Jukogyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 10/369,173

(22) Filed: Feb. 18, 2003

(65) Prior Publication Data

US 2003/0155782 A1 Aug. 21, 2003

(30) Foreign Application Priority Data

Feb. 19, 2002 (JP) .................................. 2002-041573

(51) Int. Cl.[7] ................................................ B60R 19/44
(52) U.S. Cl. ...................................... 293/142; 293/102
(58) Field of Search ................................ 293/142, 120, 293/121, 123, 132, 133, 154, 155, 102

(56) References Cited

U.S. PATENT DOCUMENTS

| 4,783,104 A | | 11/1988 | Watanabe et al. |
| 5,425,561 A | * | 6/1995 | Morgan ...................... 293/154 |
| 5,803,517 A | | 9/1998 | Shibuya |
| 5,997,057 A | | 12/1999 | Gasko et al. |
| 6,042,163 A | * | 3/2000 | Reiffer ........................ 293/154 |
| 6,179,353 B1 | | 1/2001 | Heatherington et al. |
| 6,318,775 B1 | * | 11/2001 | Heatherington et al. .... 293/154 |
| 6,334,638 B1 | * | 1/2002 | Yamamuro et al. ......... 293/154 |
| 2002/0017794 A1 | * | 2/2002 | Anderson et al. ........... 293/102 |

FOREIGN PATENT DOCUMENTS

| DE | 196 03 958 A1 | 8/1997 |
| EP | 1 063 135 A2 A3 | 12/2000 |

OTHER PUBLICATIONS

European Search Report, dated Jun. 13, 2003, issued by the European Patent Office, for European Patent Application No. EP 03250961.4 (4 pages).

* cited by examiner

Primary Examiner—Lori L. Coletta
(74) Attorney, Agent, or Firm—Smith, Gambrell & Russell

(57) ABSTRACT

An automotive bumper structure includes a hollow bumper beam extending in a widthwise direction of a vehicle, a pair of left and right stays fixed to a vehicle body and supporting the bumper beam and beam protector provided at the left and right ends of the bumper beam for protecting the bumper beam so as to be easily formed due to a straight configuration and accordingly reduced the production cost thereof.

2 Claims, 5 Drawing Sheets

AUTOMOTIVE BUMPER STRUCTURE

BACKGROUND OF THE INVENTION

1. Field of the Invention

The present invention relates to a structure of an automotive bumper disposed at a front end or at a rear end of a vehicle and more particularly to a bumper structure having protector means at left and right ends of a bumper beam.

2. Discussion of Related Arts

Generally, a vehicle has a bumper at front and rear ends thereof, respectively. As illustrated in FIG. 6, a well known bumper has a transversely elongated hollow bumper beam 11 and a pair of left and right stays 12 supporting the bumper beam 11 on a body side and secured to a vehicle body. The bumper beam has an energy absorbing foam on an outer surface thereof or on an opposite side of the bumper beam 11 with respect to the vehicle body and the energy absorbing foam is covered on an outer surface thereof with a fascia.

The bumper beam 11 has an overhang portion 13 outwardly extending from respective stays to left and right. Further, as shown in FIG. 6, the bumper beam 11 is bent inwardly at a connecting portion of the bumper beam 11 and the stay 12 and the overhang portion 13 is slanted toward the vehicle body. As a result, when a corner section of the vehicle abuts against an obstacle, an impact load exerted on the vehicle can be efficiently received at the overhang portion 13 of the bumper beam 11.

However, in the aforesaid automotive bumper structure, since the bumper beam is inwardly bent in consideration of collisions of corner sections of the vehicle with obstacles, the bumper beam structure has disadvantages in a moldability of the bumper beam and manufacturing cost of the vehicle. Further, the bumper structure has a restriction in a bending configuration of the bumper beam from the view point of the moldability of the bumper beam and a requirement of collision performances of the vehicle. As a result, freedom of molding of the fascia is also restricted and the bumper beam of the prior art is disadvantageous aerodynamically and aesthetically.

SUMMARY OF THE INVENTION

It is an object of the present invention to provide an automotive bumper structure capable of reducing manufacturing cost of a vehicle and of enlarging a freedom of molding a fascia without exacerbating collision performances of the vehicle.

In order to achieve an object, the automotive bumper structure comprises a bumper beam extending in a widthwise direction of the vehicle, a pair of left and right stays fixed to a body of the vehicle for supporting the bumper beam at each end portion of the bumper beam and a pair of left and right protector means provided at the end portion of the bumper beam for protecting an opposite side of the end portion of the bumper beam with respect to the vehicle. For example, the protector means include a beam protection section extending in a lengthwise direction of the vehicle outside of the end portion of the bumper beam and a bracket section integrally connected with the beam protection section and extending in the widthwise direction of the vehicle and fastening means for fastening the bumper beam to the body of the vehicle together with the bracket section.

DESCRIPTION OF PREFERRED EMBODIMENTS

Figure 1:
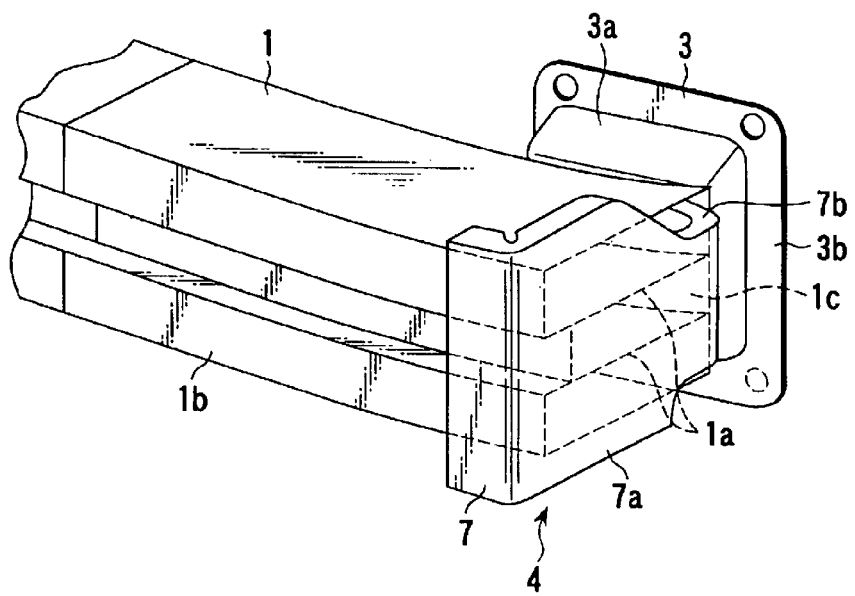
FIG. 1 is a perspective view showing an automotive bumper structure according to a first embodiment of the present invention.
Figure 2:
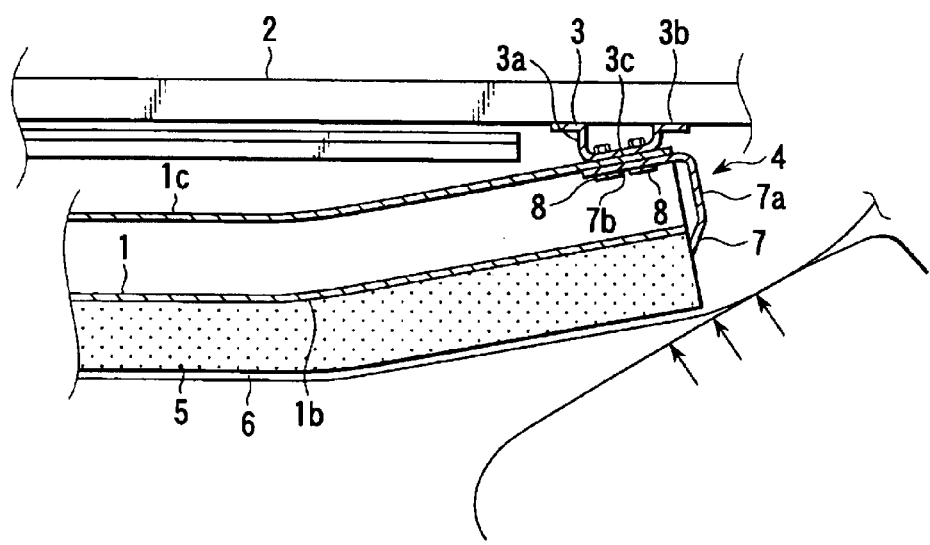
FIG. 2 is a sectional diagram taken along a horizontal line of FIG. 1.

Referring to FIGS. 1 and 2, an automotive bumper structure according to the first embodiment of the present invention comprises a transversely elongated hollow bumper beam 1, a pair of left and right stays 3 secured to a vehicle body 2 for supporting the bumper beam 1, a pair of left and right beam protector means 4 for protecting both ends of the bumper beam 1, an energy absorbing foam 5 disposed in front of the bumper beam 1 and a fascia 6 for covering the bumper beam 1 and the energy absorbing foam 5 and for forming an outer shell of the vehicle. The bumper structure described in preferred embodiments is a front bumper disposed at the front end of the vehicle and the principle of the present invention is applied to a rear bumper disposed at the rear end of the vehicle.

Figure 3:
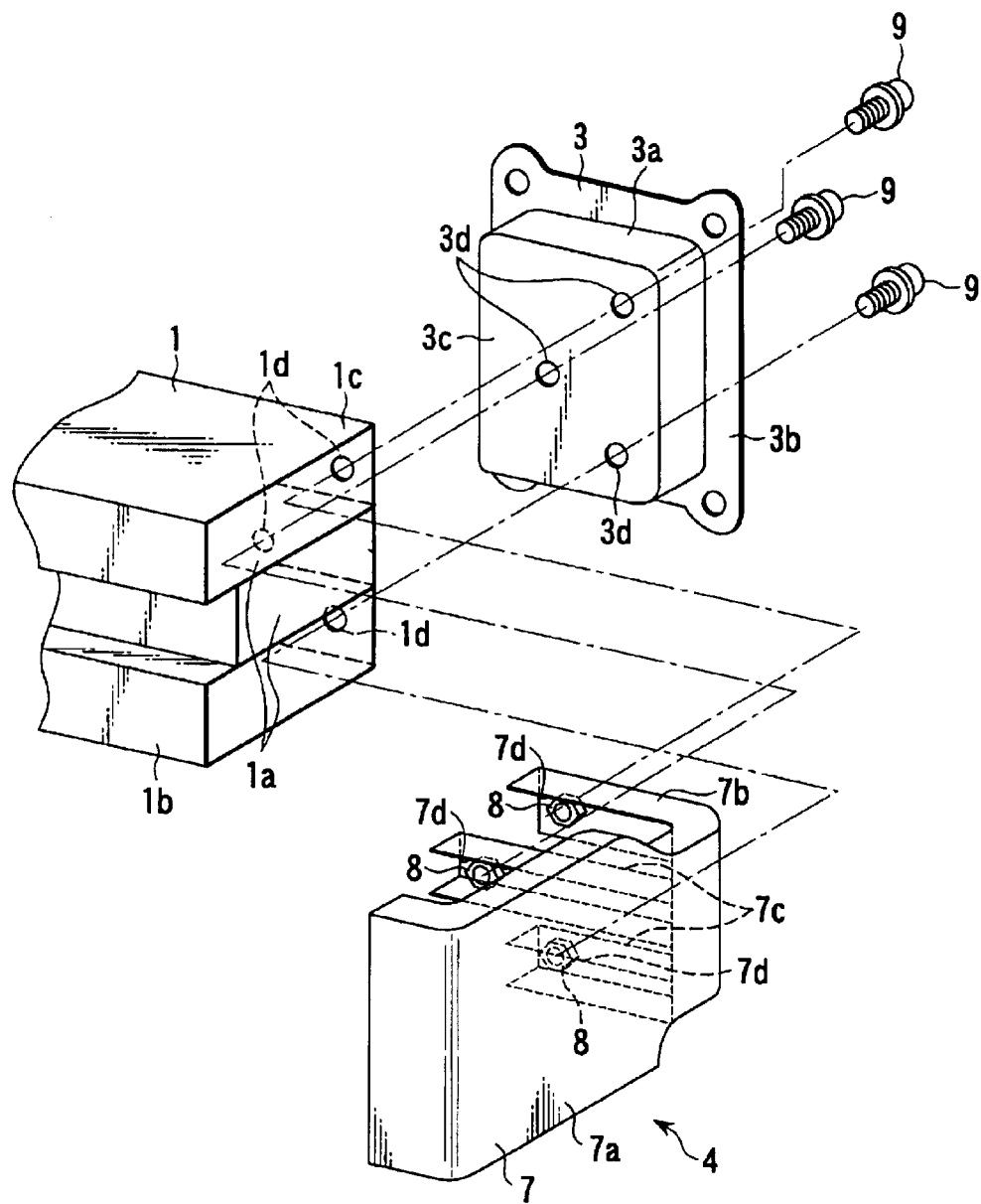
FIG. 3 is an exploded perspective view of the automotive bumper structure according to the first embodiment of the present invention.

Referring to FIG. 3, the bumper beam 1 has a rectangular cross section and openings at left and right ends thereof, respectively. Further, the bumper beam 1 is supported at both ends thereof by the respective stays 3. The bumper beam 1 spans the left and right stays 3 approximately straightforward.

In this embodiment, the bumper beam 1 is made of aluminum alloys with the surface coated by an alumite and the like.

The bumper beam 1 has two partition walls 1a, 1a horizontally dividing an inside space thereof into three rectangular closed cross section as viewed from a lateral side. Further, the bumper beam 1 has a front wall 1b formed stepwisely and as a result, the front wall 1b of an upper and lower closed cross sections is projected forwardly from the front wall 1b of a center closed cross section.

The bumper beam 1 has a rear wall 1c formed vertically flat and a plurality of bolt holes 1d are provided on the rear wall 1c in the vicinity of the left and right ends of the bumper beam 1, respectively. In this embodiments, three bolt holes 1d are formed on each side, one on the rather central side and two on the end side of the bumper beam 1.

The stay 3 has a rectangular configuration as viewed from front and is formed in such a manner that a central portion 3a is forwardly projected from a flange section 3b. The central portion 3a has a contact surface 3c at the front end thereof and the contact surface 3c contacts the rear wall 1c of the bumper beam 1. Bolt hoes 3d are provided in a position corresponding to the respective bolt holes 1d on the contact surface 3c. The flange section 3b is secured to the body 2 by bolts and nuts. In this embodiment, the stay 3 is made of steel plate with the surface coated by the electrodeposition coating method.

As shown in FIG. 3, the beam protector means 4 incorporates a L-shaped beam protection member 7. The beam protection member 7 comprises a beam protection section 7a extending in a lengthwise direction of the vehicle on the outside of each end of the bumper beam and a bracket section 7b extending in a widthwise direction of the vehicle inside of an end portion of the bumper beam 1. That is, a rear end of the beam protection section 7a is integrally connected with an outer end of the bracket section 7b. In this embodiment, the beam protection member 7 is made of a steel plate with the surface coated by an electrode position process.

As shown in FIG. 1, since the front end of the beam protection section 7a is bent inwardly so as to enclose the end portion of the bumper beam 1 from outside, a front corner and the end portion of the bumper beam 1 are protected by the beam protection section 7a.

Further, as shown in FIG. 2, the bracket section 7b is secured to the vehicle body 2 together with the rear wall 1c of the bumper beam 1 and the stay 3. The bracket section 7b has two relief sections 7c so as to enter into an inner space of the bumper beam 1 without interfering with the partition walls 1a.

Further, bolt holes 7d are provided in a position corresponding to the respective bolt holes 1d of the bumper beam 1 on the bracket sections 7d. Further, nuts 8 are welded to the respective bracket sections at a position sharing centers of the nuts 8 and the bolt holes 7d.

Bolts 9 are screwed into the nuts 8 through the bolt holes 3d of the stay 3, the bolt holes 1d of the bumper beam 1 and the bolt holes 7d of the beam protection member 7 to fasten the bumper beam 1 and the beam protection member 7 onto the stay 3. Further, the bolts 9 are screwed into the nuts 8 so as not to contact the periphery edge of the bolt holes 1d of the bumper beam 1.

In thus constituted automotive bumper structure, as shown in FIG. 2, when an impact load is applied to the corner of the vehicle, since the load is exerted to the beam protection member 7 through the fascia 6, the end portion of the bumper beam 1 is protected. That is, the end portion of the bumper beam 1 can be prevented from directly receiving impact loads. In this case, if there is no beam protection member and the like, the end portion of the bumper beam 1 has a damage such as cracks and as a result the fascia 6 is torn too.

Further, since the bracket 7b of the beam protection member 7 is fastened to the stay 3 by the respective bolts 9 and nuts 8, the impact load applied to the beam protection member 7 is transmitted to the vehicle body 2 through the stay 3.

In assembling the vehicle, the beam protection member 7 and the bumper beam 1 are fastened to the stay 3 by the bolts 9 and the nuts 8, forming a bumper assembly. In the assembly line, this bumper assembly is attached to the vehicle body 2.

In case of the automotive bumper structure according to the embodiment, since the surface of the stay 3 is coated by the elecrodeposition coating method, there is no occurrence of electric potential difference between the steel-made stay 3 and the aluminum-made bumper beam 1. Similarly, there is no occurrence of potential difference between the beam protection member 7 and the bumper beam 1.

Further, since the nuts 8 are welded to the steel-made beam protection member 7 and heads of the bolts 9 contact the steel-made stay 3, when the coating of the stay 3 is peeled off on screwing or disassembling the bolts 9, the coating of the steel-made beam protection member 7 never comes off and no difference of potential is generated between different kind of metals contacting each other.

Further, since the bumper beam 1 according to the embodiment has a substantially straightforward configuration, the bumper beam 1 has an advantage in formability and as a result the manufacturing cost of the vehicle can be reduced. Further, since the bumper beam 1 has no bent portion at both ends thereof, an adequate space can be secured between the left and right end portions of the bumper beam 1, whereby the fascia 6 can be freely designed and molded from the aethetic view point.

Further, according to the automotive bumper structure of the embodiment, since the buffer section 4 is subjected to impact loads when the corner of the vehicle has a collision, specified impact requirements can be satisfied more easily. Further, when the corner of the vehicle has a collision, since the fascia 6 has no damages such as tearing injuries, resulting in easier and more inexpensive repair works of the bumper assembly In the first embodiment, the beam protection member 7 is made of steel, however it may be made of plastic having the same operation and effect as the steel-made beam protection member of the first embodiment.

Figure 4:
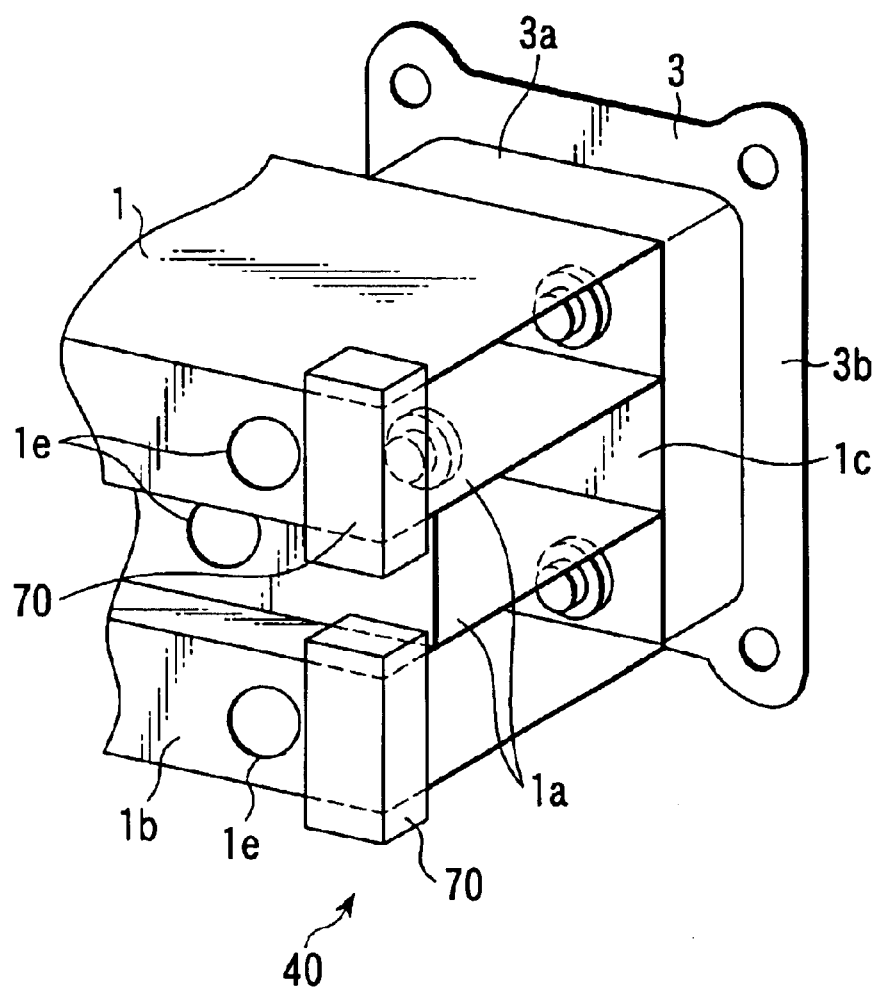
FIG. 4 is the perspective view showing the automotive bumper structure according to a second embodiment of the present invention.
Figure 5:
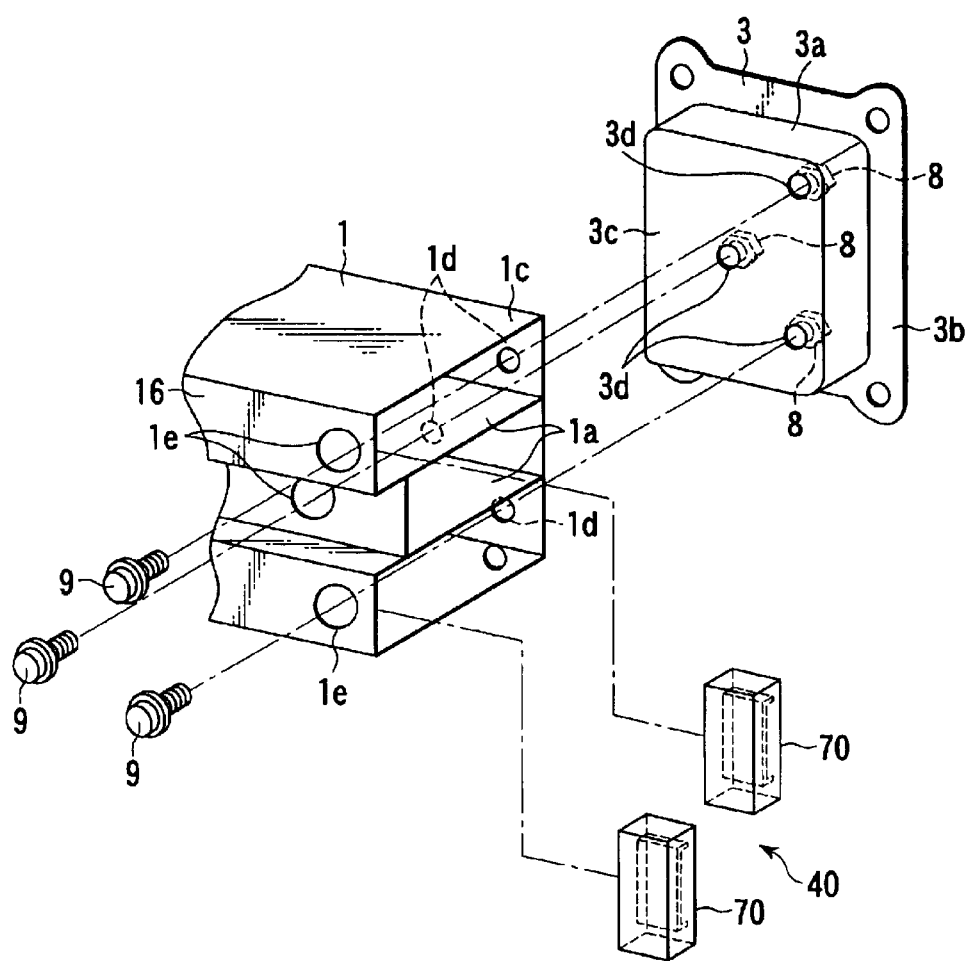
FIG. 5 is the exploded perspective view of the automotive bumper structure according to the second embodiment of the present invention.
Figure 6:
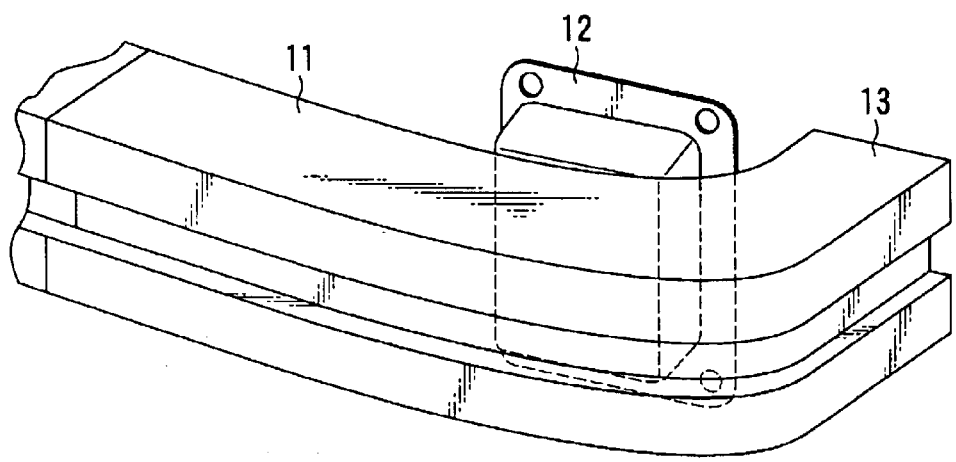
FIG. 6 is the perspective view showing the automotive bumper structure according to a prior art.

FIGS. 4 and 5 illustrate the automotive bumper structure according to a second embodiment of the present invention.

According to the second embodiment, in the same manner as the first embodiment, the bumper structure has the bumper beam 1, a pair of the left and right stays 3 fixed to the vehicle body 2 for supporting the bumper beam 1, a pair of left and right beam protector mean 40, an energy absorbing foam disposed in front of the bumper beam 1 and a fascia covering the bumper beam and the energy absorbing foam from outside and forming an exterior shell of the vehicle. The bumper beam 1 and the respective stays 3 have constructions identical to those of the first embodiment.

The beam protector means 40 has a cap member 70 for covering the corner of the end portion of the bumper beam 1. As shown in FIG. 5, the cap member 70 formed into a U-shaped configuration is inserted to the end portion of the front wall 1b of the bumper beam 1. The front wall 1b of the bumper beam 1 is formed into a stepwise configuration as described before. The cap member 70 is fit to the upper step section and the lower step section forwardly projected from the central step section, respectively. Thus, the respective front corners of the bumper beam 1 is covered with the cap member 70. In this embodiment, the respective cap members 70 are fabricated of plastic.

Further, as illustrated in FIG. 5, bolts 9 are screwed into nuts 8 welded to the stay 3 through the bolt holes 1d of the bumper beam 1 and the bolt holes 3d of the stay 3 to fasten the bumper beam 1 from the front side of the bumper beam 1. Further, working holes 1e are formed on the front wall 1b of the bumper beam 1 so as to be able to screw the bolts 9 from the front side of the bumper beam 1.

In thus constituted automotive bumper structure, when an obstacle collides with a corner of the vehicle, the end portion of the bumper beam 1 nears the fascia deformed by the obstacle and then an impact load is applied from the obstacle to the cap members 70. Thus, the end portion of the bumper beam 1 is securely protected by the respective cap members 70.

The entire contents of Japanese Patent Application No. Tokugan 2002-041573 filed Feb. 19, 2002, is incorporated herein by reference.

While the present invention has been disclosed in terms of the preferred embodiments in order to facilitate better understanding of the invention, it should be appreciated that the invention can be embodied in various ways without departing from the principle of the invention. Therefore, the present invention should be understood to include all possible embodiments which can be embodied without departing from the principle of the invention set out in the appended claims.

What is claimed is:

1. A bumper structure for a vehicle, comprising:

a bumper beam extending in a widthwise direction of said vehicle;

a pair of left and right stays fixed to a body of said vehicle for supporting said bumper beam at each end portion of said bumper beam; and a pair of left and right protector means provided at said end portion of said bumper beam for protecting an opposite side of said end portion of said bumper beam with respect to said vehicle, wherein said protector means includes a beam protection section extending in a lengthwise direction of said vehicle outside of said end portion of said bumper beam and a bracket section, said bracket section being integrally connected with said beam protection section, provided between said bumper beam and said stay, and extending in a widthwise direction of said vehicle; and fastening means for fastening said bumper beam to said body of said vehicle together with said bracket section, and wherein said fastening means penetrates said bumper beam, said bracket section and said stay so as to securely connect said bumper beam, said bracket section and said stay.

2. The bumper structure according to claim 1, wherein said protector means is a cap member for covering an opposite side of said end portion of said bumper beam with respect to said vehicle.

* * * * *